United States Patent
Choi et al.

(10) Patent No.: US 7,496,203 B2
(45) Date of Patent: Feb. 24, 2009

(54) QUANTUM-KEY DISTRIBUTION METHOD BETWEEN A PLURALITY OF USERS OR GROUPS

(75) Inventors: Sora Choi, Seoul (KR); Soojoon Lee, Seoul (KR); Dong Pyo Chi, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 844 days.

(21) Appl. No.: 10/984,084

(22) Filed: Nov. 8, 2004

(65) Prior Publication Data
US 2005/0249352 A1   Nov. 10, 2005

(30) Foreign Application Priority Data
Apr. 13, 2004   (KR) .................. 10-2004-0025246

(51) Int. Cl.
*H04L 9/00*   (2006.01)
(52) U.S. Cl. .................. 380/263; 380/277; 380/282
(58) Field of Classification Search .................. 380/263
See application file for complete search history.

(56) References Cited

U.S. PATENT DOCUMENTS

| 6,678,379 B1 * | 1/2004 | Mayers et al. ............... 380/278 |
| 7,178,277 B2 * | 2/2007 | Takeuchi .................... 380/255 |
| 7,236,597 B2 * | 6/2007 | Elliott et al. ................ 380/263 |
| 2003/0002674 A1 * | 1/2003 | Nambu et al. ............... 380/256 |
| 2003/0106084 A1 * | 6/2003 | Liu et al. ..................... 800/18 |
| 2004/0184603 A1 * | 9/2004 | Pearson et al. .............. 380/28 |

FOREIGN PATENT DOCUMENTS

KR   P1996-7005432   10/1996

OTHER PUBLICATIONS

Kumavor et al, "Comparison of Four Multi-user Quantum Key Distribution Schemes over Passive Optical Networks", Optical Society of America, 2003, pp. 1-3.*

(Continued)

*Primary Examiner*—Matthew B Smithers
(74) *Attorney, Agent, or Firm*—Blakely, Sokoloff, Taylor & Zafman LLP (57) ABSTRACT

There is provided a quantum-key distribution method between a plurality of users or groups. A center prepares a predetermined number of entangled states consisting of qubits equal to the number of the users, and generates quantum states consisting of the qubits belonging to each of the entangled states and corresponding to each of the users. The center transmits each of the quantum states to each of the users after an authentication process. Each of the users receiving the quantum state makes public an axis used to measure each of the qubits constituting the quantum states. The number of users in each group measuring the qubits with a predetermined axis is represented by module 4. If the sum of the module 4 of each group is even, each group collects the qubit measurement results of the users and acquires each group key. Therefore, it is possible to provide a high-security quantum-key distribution method between an unspecified number of users or groups.

5 Claims, 4 Drawing Sheets

OTHER PUBLICATIONS

Crepeau et al, "Secure Multi-party Quantum Computation", ACM, May 2002, pp. 643-652.*

Brassard et al, "Multi-User Quantum Key Distribution Using Wavelength Division Multiplexing", Proceedings of SPIE, 2003, pp. 149-153.*

Kumavor et al, "Comparison of Three Multi-user Quantum Key Distribution Networks", IEEE, 2003, pp. 1042-1043.*

Secure quantum cryptographic network based on quantum key distribution, arXiv: quant-ph/0403172 v1, Mar. 24, 2004, pp. 1-6.

Secure quantum cryptographic network based on quantum key distribution, pp. 1-13.

Physical Review A, vol. 54, No. 4, Oct. 1996, pp. 2651-2658.

Quantum key distribution relied on trusted information center, arXiv: quant-ph/0001045 v1, Jan. 13, 2000, 12 pages.

* cited by examiner

FIG. 4

QUANTUM-KEY DISTRIBUTION METHOD BETWEEN A PLURALITY OF USERS OR GROUPS

BACKGROUND OF THE INVENTION

This application claims the priority of Korean Patent Application No. 2004-25246, filed on Apr. 13, 2004, in the Korean Intellectual Property Office, the disclosure of which is incorporated herein in its entirety by reference.

1. Field of the Invention

The present invention relates to a quantum-key distribution method and, more particularly, to a quantum-key distribution method of a quantum cryptographic system in a network used by a plurality of users or groups.

2. Description of Related Art

Quantum-key distribution is a field of quantum cryptography which is a cryptographic system using quantum mechanics. Since a conventional cryptographic system is generated on the basis of mathematical problems where the calculation is known to be difficult, the security is not guaranteed as rapid progress is made in calculation abilities. However, quantum-key distribution is a cryptographic system using a one-time. The security of this cryptographic system is guaranteed by quantum-mechanical properties.

However, since a conventional quantum-key distribution is a cryptographic system based on a transmission of a quantum state, the conventional quantum-key distribution has mainly employed a protocol used between both users who trust quantum channels. While there have been patents concerning a method of actually realizing the aforementioned protocol, there is no patent concerning the protocol itself. Since the conventional quantum-key distribution should be based on trust in the channels used by each other, a quantum-key distribution network protocol simply connecting between both users trusting in each other has been mainly offered.

A paper entitled "Quantum cryptographic network based on quantum memories" in "Physical Review A" in 1996 discloses a quantum-key distribution method totally different from conventional methods. A protocol on a network using the method is also disclosed in this paper.

In contrast to the conventional quantum-key distribution method where an Einstein-Podolsky-Rosen (EPR) pair is first shared and then measured, in the quantum-key distribution method disclosed here, each of users, Alice and Bob, trying to distribute keys, chooses any one of four states used in the Bennett Brassard (BB84) and transmits the chosen states to a center, and then the center stores the transmitted states in a quantum memory, measures the states transmitted from the two users, and notifies the two users of the measurement results, whereby each of the users detects states transmitted from the other side on the basis of states transmitted from his own side, and acquires a key if axes are equal.

The center assists and interlinks two users to distribute a key. Each of the users transmits a required number of quantum states to the center, and the center stores the quantum states. Two users notify the center that they desire to share a key, and the center chooses and measures quantum states for the two users and notifies the two users of the measurement result. However, in this method, a quantum memory is required for a long-time storage and an efficiency for the used states is very low.

In a paper entitled "Quantum key distribution relied on trusted information center" in "Los Alamos e-print quant-ph" in January 2000, a quantum-key distribution between two users is controlled by a center, but the center only assists two users to distribute a key.

In other words, in a case where each of a center and two users A and B distributing a key has a particle using Greenberger-Horne-Zeilinger (GHZ) 3-qubit state, the center measures its own qubit and notifies the two users of the measurement result, and the users A and B detect encryption keys owned by each other on the basis of their own measurement results depending on the result of the center.

A paper entitled "Conditional efficient multiuser quantum cryptography network" in "Physical Review A" in January 2002 discloses a quantum-key distribution protocol using three nonorthogonal states. In addition, the paper describes that a quantum cryptography network is possible by using a space optical switch.

According to this paper, three users including a center select two probabilities, prepare states depending on the selected probabilities, and make two kinds of measurements on each of transmitted photons depending on the selected probabilities. That is, the security is based on the probable selection and measurement. In addition, the paper discloses a method of establishing a cascaded quantum cryptography network using the quantum-key distribution protocol and the space optical switch. However, this method can be employed when only a center can control a number of switches.

The methods disclosed in the aforementioned papers are available only if two users trust quantum channels since the methods are implemented under the basic assumption that the states used by the users distributing keys can be correctly transmitted at desired places. Accordingly, all the conventional quantum-key distribution network protocols cannot be applied to a typical network system established under the assumption that the network system is used by an unspecified number of users. In addition, the conventional quantum-key distribution network protocols cannot guarantee the unconditional security which is a basic feature of the quantum cryptography.

SUMMARY OF THE INVENTION

The present invention provides a quantum-key distribution method that can securely distribute a quantum-key used by an unspecified number of users or, groups.

According to an aspect of the present invention, there is provided a quantum-key distribution method using a center one-to-one connected to groups consisting of at least one user, comprising: (a) generating a predetermined number of entangled states consisting of qubits equal to the number of the users in the each group; (b) transmitting each of the quantum states from the center to each of the users after an authentication procedure; (c) making public an axis used to measure each of the qubits constituting the quantum states; and (d) representing as modulo 4 the number of the users of each of the groups measuring the qubits with a predetermined axis, and acquiring a key of each of the groups from measurement results of the qubits of the users collected by each of the groups if the sum of the modulo 4 of each of the groups is even.

According to another aspect of the present invention, there is provided a quantum-key distribution method using a center one-to-one connected to groups consisting of at least one user, comprising: (a) generating a predetermined number of entangled states consisting of one more qubits than the number of the users; (b) keeping a single qubit included in each of the entangled states, and transmitting each of the quantum states from the center to each of the users after an authentication procedure; (c) making public an axis used to measure each of the qubits constituting the quantum states; (d) representing as modulo 4 the number of the users of each of the groups measuring the qubits with a predetermined axis on the basis of information on the axis made public; (e) selecting in the center a measurement axis of a qubit kept by the center so that the sum of modulo 4 of each of the groups is even, and transmitting the result measured with the selected axis from the center to each of the groups; and (f) acquiring keys of each of the groups from the measurement results of the users of each of the groups.

Accordingly, there is provided a quantum key distribution method that has significantly improved the security between an unspecified number of users or groups.

DETAILED DESCRIPTION OF THE INVENTION

Exemplary embodiments according to the present invention will now be described in detail with reference to the accompanying drawings.

A quantum authentication protocol is used for securely transmitting a quantum state. The quantum authentication protocol is now set forth.

(Quantum Authentication Protocol)

A quantum authentication protocol refers to a polynomial time quantum algorithm which is conducted between two users A and B having a set K of classical keys. The quantum authentication protocol satisfies the following conditions.

Condition 1) The user A has an m-qubit message system M and a classical key k∈K as an input state, and a system T receiving m+t qubits as a result state.

Condition 2) The user B has a system T' and a classical key k∈K as an input value, and an m-qubit message system M and a qubit V indicating acceptance or rejection as a result value.

Super-operators corresponding to the users A and B are denoted by $A_k$ and $B_k$ with respect to a certain fixed classical key k, respectively.

In addition, the aforementioned quantum authentication protocol is generally secure when the following definition is satisfied.

(Security of Quantum Authentication Protocol)

A quantum authentication protocol is defined to be secure with error ϵ if a quantum authentication system satisfies the followings.

Completeness: $B_k(A_k(|\phi\rangle\langle\phi|))=|\phi\rangle\langle\phi|\hat{X}|ACC\rangle\langle ACC|$ for all the classid keys k∈K.

Soundness: When any intervention of an eavesdropper to all the super-operators O is described by super-operators O, a result state measured by the user B is denoted by $\rho_{Bob}$.

That is, $$\rho_{Bob} = E_k[B_k(O(A_k(|\varphi\rangle\langle\varphi|)))] = 1/|K|\sum_k B_k(O(A_k(|\varphi\rangle\langle\varphi|)))$$

Here, $E_k$ denotes an expectation value when k is equally chosen at random from K. If $Tr(P_1^{|\Phi\rangle}\rho_{Bob})\geq 1-\epsilon$, a quantum authentication protocol is described to have the soundness by error ϵ for a state |ϕ>. If a quantum authentication protocol is described to be secure by error ϵ for the state |ϕ>, the quantum authentication protocol is defined to be secure by error ϵ.

In addition, a quantum-key distribution protocol is described to be secure by the following definition.

(Security of Quantum-key Distribution Protocol)

For certain security variables s>0 and t>0 chosen by the users A and B who give and take a key, a quantum-key distribution protocol is defined to be secure if it can be guaranteed that an amount of information on a final key of an eavesdropper is less than $2^{-t}$ when the protocol is interrupted or eavesdropping is successful with at least a probability of $1-O(2^{-\epsilon})$ by a certain eavesdropping strategy. In addition, a key string should be substantially random.

A stabilizer purity testing code with error ϵ used for encoding when a quantum message is authenticated is a set $\{D_k\}$ of stabilizer codes satisfying $$\#\left\{k \mid x \in D\frac{1}{k} - D_k\right\} \leq e(\#K)$$

for a certain error $E_x \in E$ when x≠o for k∈K.

The concept of quantum teleportation is now set forth for understanding of the encryption used here.

After the users A and B share an EPR (Einstein-Podolsky-Rosen) pair, the user A measures a quantum state ρ to be transmitted to the user A among half of the states with a Bell basis, and acquires two classical keys k. If k is transmitted to the user B, a single qubit can be securely transmitted. The user B can acquire a quantum state ρ which the user A intended to transmit if a proper operation is performed depending on k. At this time, k plays a core role in a process of acquiring the information on ρ. If the users A and B have a private key k as an encryption key which is divided into parts belonging to each of the users A and B, the user A can make ρ' and securely transmit ρ to the user B, and the user B can acquire ρ from ρ. An encryption operation in a protocol according to the present invention is conducted according to the aforementioned encryption method.

The following new terms are defined to describe a protocol according to the present invention.

Let G be a group of t users.

Suppose that when a t-qubit entangled state $$|\Phi_j^t\rangle = \frac{1}{\sqrt{2}}\left(\bigotimes_{i=0}^{t}|0\rangle + \bigotimes_{i=0}^{t}|1\rangle\right)$$

is given, each of the users of the group G takes a qubit of the quantum states and measures the qubit with the x or the y axis.

$N_y^G$ is the number of the users of the group G measuring a quantum state with the y axis represented by modulo 4, and is defined as $$-M_y^G = \left[\frac{N_y^G}{2}\right].$$

$P^G$ is defined as the sum of modulo 2 of results measured by the users of the group G.

In addition, the properties of the entangled state $|\phi_\tau^+\rangle$ are described in the following table using the terms defined above. The quantum-key distribution network protocol according to the present invention makes progress according to the relation presented in this table.

TABLE 1

|  | $N_y^A + N_y^B$ | A | | B | |
|---|---|---|---|---|---|
|  |  | $N_y^A$ | $M_y^A + P^A$ | $N_y^B$ | $M_y^B + P^B$ |
| $|\Phi_t^+\rangle$ | even | even | 0 | even | 0 |
|  |  |  | 1 |  | 1 |
|  |  | odd | 0 | odd | 1 |
|  |  |  | 1 |  | 0 |

The protocol according to the present invention is now set forth with reference to table 1.

Here, suppose that a group has A consisting of k users and B consisting of l users (n=k+l).

When k=1 and l=1, the protocol becomes a quantum-key distribution network protocol consisting of an unspecified number of users. In addition, the stabilizer purity testing code is a code which encodes v qubits into u qubits. $P^A$ and $P^B$ acting as a substantial key in the protocol according to the present invention are acquired by a user called a collector. The users play the collector's role by turns for each bit.

Figure 1:
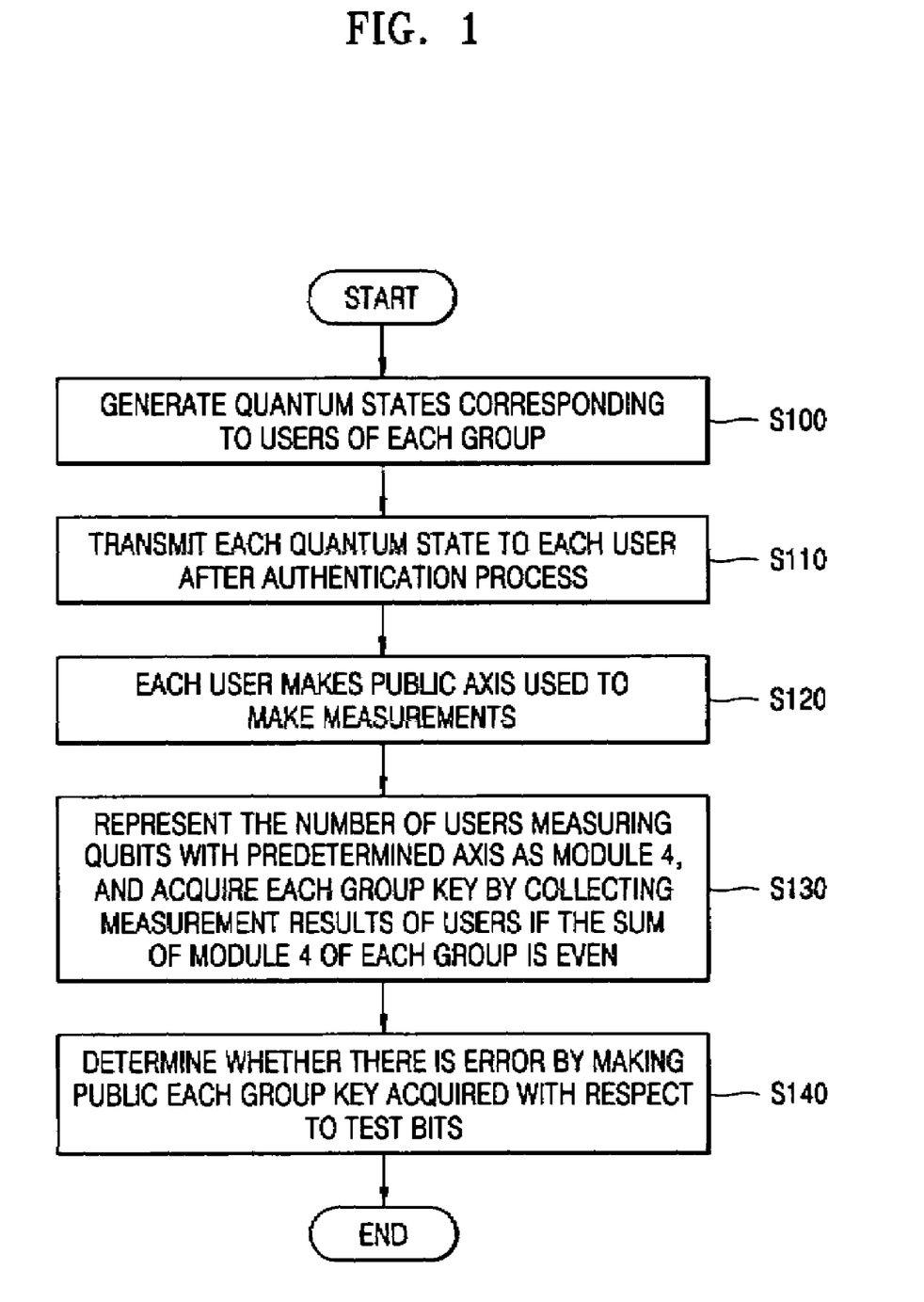
FIG. 1 is a flowchart showing an embodiment of a quantum-key distribution method according to the present invention.

FIG. 1 is a flowchart showing an embodiment of a quantum-key distribution method (protocol) according to the present invention.

A plurality of groups including a plurality of users are one-to-one connected to a center, and the center generates m-qubit quantum states corresponding to the users of each of the groups (S100). In other words, the center prepares a predetermined number (m) of entangled states consisting of qubits equal to the number of the users, and generates m-qubit quantum states consisting of qubits equal to the number of the users in each of the entangled states.

The center transmits a quantum state corresponding to each of the users after an authentication process (S110). A method of authenticating a quantum message can employ a non-interactive authentication method based on a purity testing code. The authentication method will be described in detail with reference to FIG. 2.

Each of the users receives a corresponding quantum state after an authentication operation, measures the received m-qubit quantum state, and makes public an axis used to make the measurement (S120). Each of the users measures each qubit in a quantum state using a certain axis (the x or the y axis).

Each group represents the number of users measuring the qubits with a specific axis (the x or the y axis) as modulo 4 on the basis of information on an axis made public by each of the users. If the sum of modulo 4 of each group is even, the measurement results of the users are collected and a key of each group is acquired (S130).

A test bit string is chosen to identify whether there are cheating users within the group after the group key is acquired, and it is determined whether there are cheating users by making public the group key for the chosen bit string (S140).

Figure 2:
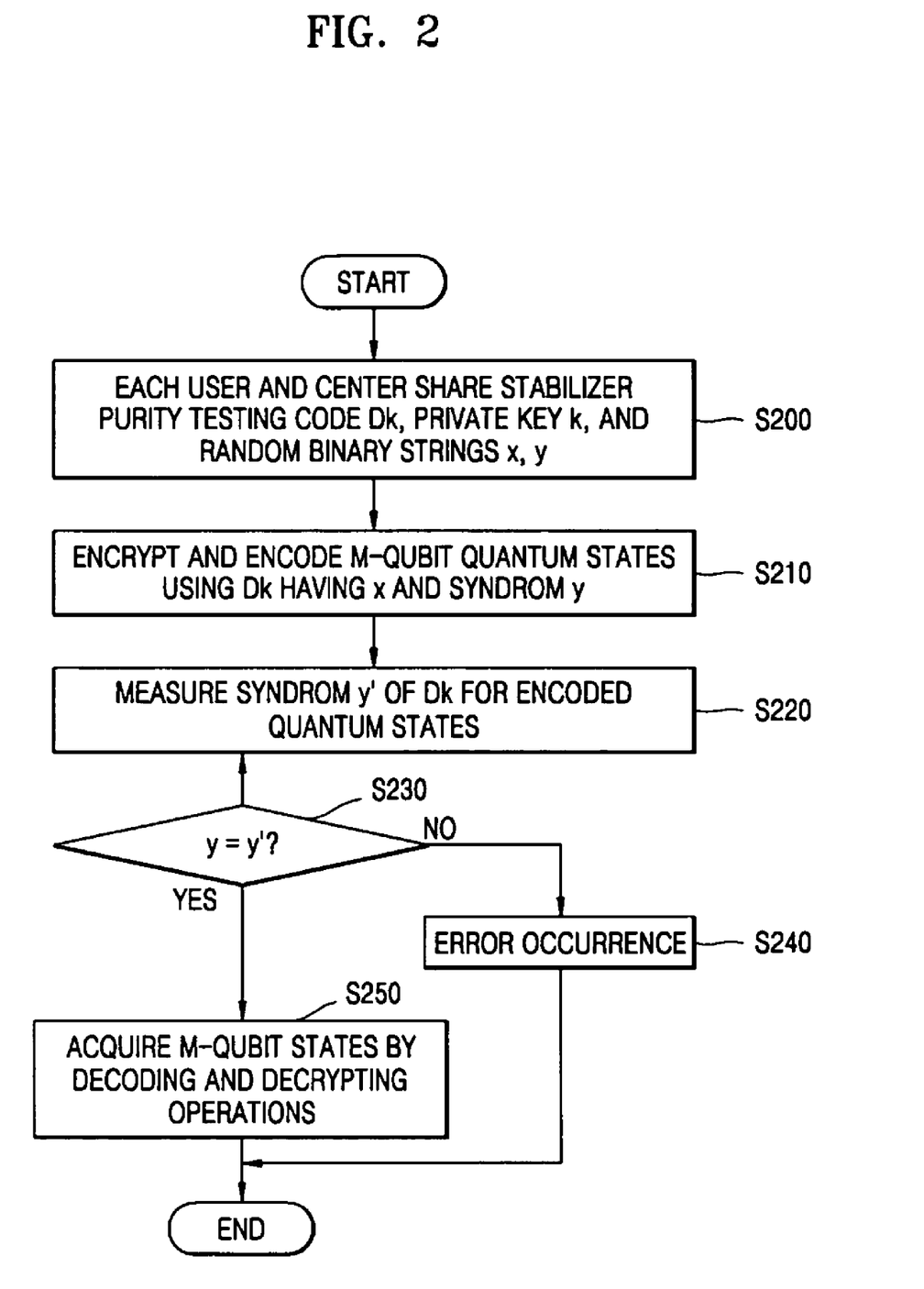
FIG. 2 is a flowchart showing an embodiment of an authentication procedure for quantum state transfer.

FIG. 2 is a flowchart showing an embodiment of an authentication procedure for quantum state transfer.

A plurality of groups including a plurality of users are one-to-one connected to a center, and the center and each of the users share a stabilizer purity testing code $D_k$, a private key k, random binary strings x and y (S200).

The center encrypts m-qubit quantum states corresponding to each of the users using x, encodes the encrypted quantum states using $D_k$ having a syndrome y, and transmits each of the encoded quantum states to each of the users (S210).

Each of the users receives the quantum states encrypted and encoded, and measures a syndrome y' of $D_k$ for the received quantum states (S220).

An error in the authentication process is detected by comparing y and S230). If y and y' are not equal, an error is determined to have occurred and thus all quantum states are discarded and the process is started over again (S240). If y and y' are equal, each of the users decodes the encrypted and encoded quantum states using $D_k$ and decrypts the decoded quantum states using x, thereby acquiring m-qubit quantum states (S250).

Figure 3:
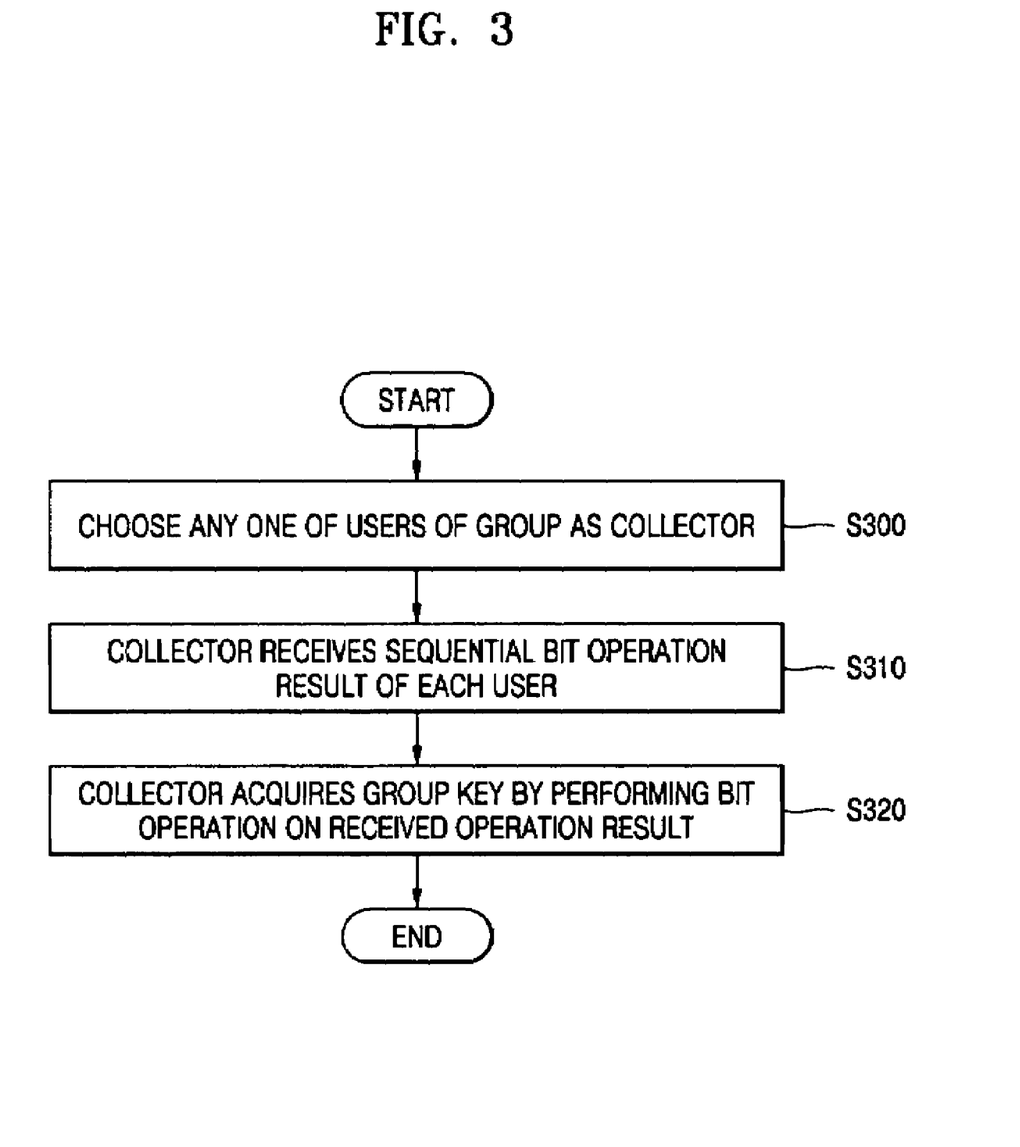
FIG. 3 is a flowchart showing a procedure where each group acquires a key in a quantum-key distribution method according to the present invention.

FIG. 3 is a flowchart showing a procedure where each group acquires a key in a quantum-key distribution method according to the present invention.

Each of the users receiving a corresponding m-qubit quantum state from the center measures a quantum state with a predetermined axis, and chooses any one of the users of a group as a collector (S300).

The collector chooses a predetermined bit, performs a bit operation on his own measurement result and the chosen bit, and sends the bit operation result to another user. The user receiving the bit operation result performs a bit operation on the bit operation result and his own measurement result, and sends the bit operation result to another user, whereby each of the users sequentially performs a bit operation (S310). The bit operation result sequentially performed by all the users is finally sent to the collector (S310).

The collector acquires a group key by performing a bit operation on the received operation result and the bit initially chosen by the collector (S320).

Figure 4:
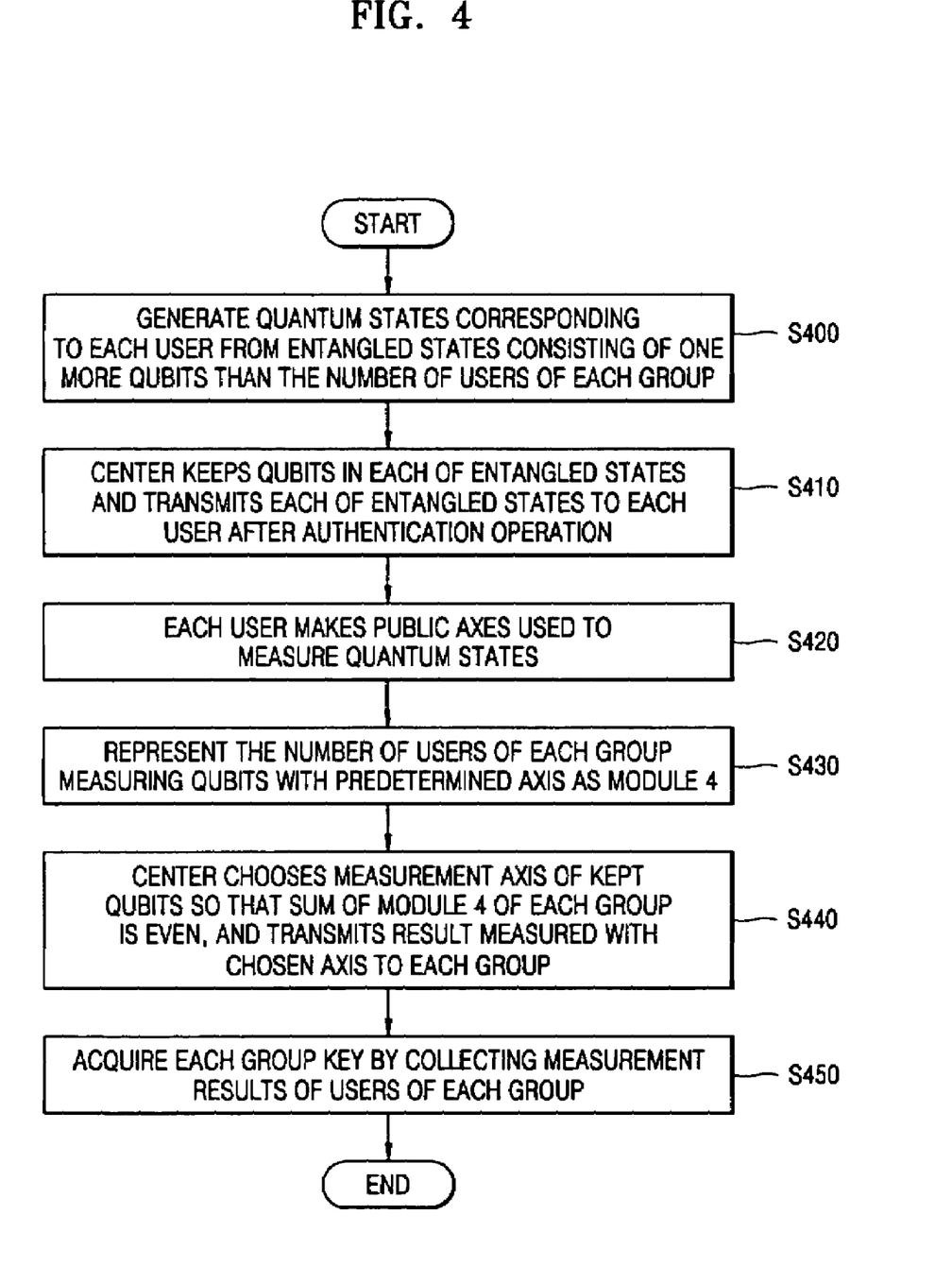
FIG. 4 is a flowchart showing another embodiment of a quantum-key distribution method according to the present invention.

FIG. 4 is a flowchart showing another embodiment of a quantum-key distribution method according to the present invention.

A plurality of groups including a plurality of users are one-to-one connected to a center. The center prepares a predetermined number (m) of entangled states consisting of one more qubits than the number of all users, and generates m-qubit quantum states corresponding to each of the users consisting of the qubits in the entangled states (S400).

The center keeps a remaining qubit which is not assigned to each of the users in each of the entangled states, and sends each of the generated m-qubit quantum states to each of the users after an authentication operation (S410). The authentication procedure is conducted through the same as the procedure shown in FIG. 2.

Each of the users measures the transmitted m-qubit quantum states with a predetermined axis, and makes public the axis (S420). Each group represents the number of the users measuring the qubits with a specific axis as modulo 4 (S430).

The center chooses the measurement axis of the kept qubits so that the sum of modulo 4 of each group is even, and transmits the result measured with the chosen axis to each group (S440).

Each group collects the measurement results of the users to acquire a key of each group (S450). The procedure of acquiring the group key uses the method shown in FIG. 3.

The quantum-key distribution method (protocol) according to the present invention is now set forth again. Here, C denotes a center which is connected to two groups A and B.

(Protocol)

1. Preparation: The center C and users l of each of the groups A and B share a stabilizer purity testing code $D_k(l)$, $k(l)$ to be used as a private key, and random binary strings $x(l)$ and $y(l)$.

2. The center C prepares cat states $|\phi_n^+\rangle^{\tilde{x}v}$ for v. A qubit of $|\phi_n^+\rangle$ to be taken by each of the users l within the states is represented by $\rho(I)$. $\rho(I)\hat{X}v=\rho(I)$. The center C encodes $\rho(I)$ into $\tau(I)$ using $x(l)$.

3. The center C encodes $\tau(I)$ into $\sigma(I)$ by using a code $D_{k(I)}$ having a syndrome $y(I)$, and transmits $\sigma(I)$ to the users l.

4. The users l receive the transmitted quantum state which is denoted by $\sigma(I)'$. The users l measure a syndrome $y(I)'$ of a code $D_{k(I)}$ in the transmitted quantum state. The users l compare $y(I)$ and $y(I)'$. If any error is detected, the protocol is interrupted. If not, the users l decode their own quantum state into $\tau(I)'$ by $D_{k(I)}$, and decrypts $\tau(I)'$ into v qubit $\rho(I)'$ using $x(I)$.

5. Each of the users of two groups A and B randomly chooses a qubit of $|\phi_n^+\rangle$ received by each of the users, and measures the chosen qubit with the x or the y axis. Here, the two groups A and B acquire v after measuring. The center C and the two groups repeat the aforementioned operations until required key strings can be acquired.

6. All the users of the two groups A and B make public the axes used for measuring the transmitted qubits. However, it is not the measurement result for the transmitted qubits. The two groups A and B acquire $N_y^A$ and $N_y^B$, respectively. If $N_y^A+N_y^B$ is odd, all are discarded.

7. The collector collects the measurement axes of all the users for each of the transmitted qubits, and the two groups A and B acquire $P^A$ and $p^B$ using the collector.

8. The two groups choose a bit string to be publicly used for a test to identify whether there were cheating users. $P^A$ and $p^B$ are made public for the test bits. It is identified whether there are the cheating users. If an error occurs, all the shared bits are discarded and the process is restarted from the first operation of the protocol. If not, the two groups acquire a key string.

There are many possible methods of acquiring $P^A$ and $p^B$ in operation 7.

For instance, suppose that a first of the users of each group is a collector. The order of the users is determined at random. After the collector randomly chooses a bit and represents the chosen bit as R, the collector performs a bit operation on his own bit measurement result and R and transmits the bit operation result to the next user. Like this, each of the users performs a bit operation. When the final result is transmitted to the collector again, the collector performs a bit operation on the result and R to acquire $P^A$ and $p^B$. If the number of the users of each group is one, such a procedure is not necessary.

If the measurement operation is modified in the aforementioned protocol, the efficiency of the shared state can be increased. That is, a case where the shared states are discarded due to disaccord of measurement axes of the users. However, the center should keep a quantum memory for performing such a procedure. More specifically, the aforementioned protocol is modified as follows.

2'. The center C prepares cat states $|\phi_{n+1}^+\rangle^{\tilde{x}v}$ for v. A qubit of $\phi_{n+1}^+\rangle$ to be taken by each of the users l within the states is represented by $\rho(I)$. $\rho(I)^{\tilde{x}v}=\rho(I)$. The center C encrypts $\rho(I)$ into $\tau(I)$ using $x(I)$.

5'. The qubits in each of the remaining $|\phi_{n+1}^+\rangle$ are kept by the center. Each of the users of the two groups except the center measures the transmitted qubits with the x or the y axis which is chosen at random.

6'. All the users of the two groups A and B make public the axes used to measure the transmitted qubits. However, it is not the measurement result for the transmitted qubits. The two groups A and B acquire $N_y^A$ and $N_y^B$, respectively. Referring to the result, the center chooses an axis with which a measurement is made so that $N_y^A+N_y^B$ becomes even for all the qubits belonging to the center, and then measures using the axis. The center notifies the two groups of the measurement result.

If the number of the users of each group is one in the aforementioned protocol, the quantum-key distribution network can be used by a plurality of users. If the number of the users of each group is plural, the quantum-key distribution network can be used by a plurality of groups. If there are users having an authority to permission in distributing a key, the center C consists of a group made up of such users and a chairman of the group is elected. All the users of the center C except the chairman follow the aforementioned procedures like the users of other groups. The chairman determines his own axis referring to the axes of other users and measures using the axis. The chairman collects measurement results of all the users of the center C and notifies other groups of the results in operation 6'. Accordingly, the aforementioned protocol cannot make progress without permission of the users of the center C.

In order to use a quantum-key distribution protocol in a typical network used by an unspecified number of users, a trust in quantum transmission channels and quantum states used by each other is most needed. A protocol used in this case is a quantum authentication protocol.

A paper entitled "Authentication of Quantum Message" in "Los Alamos e-print quant-ph" in May 2002 discloses a secure quantum authentication protocol. However, the protocol cannot transmit a portion of the entangled state. The protocol disclosed in this paper is first set forth, and then the security of the aforementioned two protocols is set forth in association with the protocol.

1. Preliminary operation: Suppose that the users A and B share a stabilizer purity testing code $\{Q_k\}$, a private key k, and random binary keys x and y.

2. The user A encrypts $\rho$ into $\tau$ using x. $\tau$ is encoded into $\sigma$ using a code $Q_k$ having a syndrome y. The user A transmits $\sigma$ to the user B.

3. The user B receives the transmitted n-qubit states which are represented by $\sigma'$. User l measures his own state for $Q_k$ with syndrome y'. The user l compares y and y'. If any error is detected, this protocol is interrupted. If not, the user l decodes his own quantum state into $\tau'$ using $Q_k$. The user l decrypts $\tau$ into v qubit $\rho'$ using x.

When a purity testing code $Q_k$ of the aforementioned authentication protocol has an error $\epsilon'$, this protocol becomes a secure quantum authentication protocol having a key length of $O(n+\log_2(\#K))$ with a soundness error $\epsilon'$. Accordingly, the fidelity is $F(\rho,\rho')\geq 1-\epsilon'$.

When all the procedures of the aforementioned protocol is set as an operation A, i.e., $\rho'=\Lambda(\rho)$, a first quantum-key distribution network protocol is as follows.

If a quantum state of each of the users l is $\rho_l$ and procedures of the protocol for each of the users are $\Lambda_l$, the fidelity is $$F\left(\bigotimes_j \rho_l, \bigotimes_l \Lambda_l(\rho_l)\right) = \prod_l F(\rho_l, \Lambda_j(\rho_j)) \geq 1 - n\varepsilon'.$$

If $n\varepsilon = \varepsilon$, the fidelity of the first quantum-key distribution network protocol becomes larger than $1-\varepsilon$. Accordingly, the quantum states can be regarded as having been securely shared. This means that when quantum states are transmitted, eavesdropping from outside has failed or there is no eavesdropper. If $\varepsilon$ is set to be smaller than $2^{-s}$ for a security parameter s, the quantum-key distribution network protocol can be regarded as secure.

In a quantum-key distribution network protocol between groups consisting of more than one user, there may be a case where anyone within the group tries to keep a key to oneself. In this case, the user trying to keep a key to oneself should modify $N_y^A(N_y^B)$ or $P^A(P^B)$. In this case, however, the user cannot know bits to be used for an error test until his own measurement result is notified. Accordingly, an error should not be created for all cases.

However, a simple modification of $N_y^A$ ($N_y^B$) or $P^A(P^B)$ creates an error. Making an error not detected means that two groups take a legitimate key. Accordingly, it can be seen that each of the users within the group cannot keep a key shared by two groups to oneself from one's own information.

It can be seen that the security of the second protocol is also secure from the following axiom and the aforementioned facts.

(Axiom)

$\Lambda_{A \cup B}$ is a certain quantum channel. When $\forall |\phi\rangle \in (C^{2c})^{\tilde{x}v}$ and $\langle\phi|\Lambda_{A \cup c}(|\phi\rangle\langle\phi|)|\phi\rangle \geq 1-\tau$ for each t, $$\langle\Phi_{l+1}^+|^{\otimes v}(I_C \otimes \Lambda_{A \cup B})(|\Phi_{i+1}^+|^{\otimes v}\langle\Phi_{l+1}^+|^{\otimes v})|\Phi_{l+1}^+\rangle^{\otimes v} \geq 1 - \frac{2^v+1}{2^v}\varepsilon.$$

When the state of a center is $\rho_C$, the fidelity is $$F\left(\left(\rho_C \otimes \left(\bigotimes_l \rho_l\right)\right), \left(I \otimes \left(\bigotimes_l \Lambda_l\right)\right)\left(\rho_C \otimes \left(\bigotimes_l \rho_l\right)\right)\right) \geq 1 - \frac{2^v+1}{2^v}\varepsilon.$$

When $$\rho_C \otimes \left(\bigotimes_l \rho_l\right) = |\Phi_{n+1}^+\rangle^{\otimes m} \text{ and } \bigotimes_l \Lambda_l = \Lambda_{A \cup B},$$

the condition of the axiom is satisfied from the security of the first protocol and the axiom is thus valid. Accordingly, the quantum authentication protocol can be proved to be secure, and the quantum-key distribution protocol can be also proved to be secure. The users A and B can detect that a case where users within a group intend to keep a key to themselves is impossible because of the same reason as the first protocol. Accordingly, only a case where the center intends to detect keys of two groups will be now examined. The center measures after the measurement results of other users are obtained. Since an axis used in measuring and the measurement results are altered, it is impossible to detect $P^A$ or $P^B$ directly creating a key without error. Accordingly, the center cannot keep the key to itself.

It can be seen that the aforementioned two protocols are secure from the facts described above.

According to the present invention, it is possible to conduct quantum-key distribution successfully even in a network consisting of an unspecified number of users or groups, and to present a high security level in a network based on classical cryptography as well as a network presented in conventional quantum cryptography.

While the present invention has been described with reference to exemplary embodiments thereof, it will be understood by those skilled in the art that various changes in form and details may be made therein without departing from the scope of the present invention as defined by the following claims.

What is claimed is:

1. A quantum-key distribution method using a center one-to-one connected to groups consisting of at least one user, comprising:

generating a predetermined number of entangled states consisting of qubits equal to a number of users;

transmitting each of the quantum states from the center to each of the users after an authentication procedure;

making public an axis used to measure each of the qubits constituting quantum states by each of the users receiving the quantum states; and representing as modulo 4 the number of the users of each of the groups measuring the qubits with a predetermined axis, and acquiring a key of each of the groups from measurement results of the qubits of the users collected by each of the groups if the sum of the modulo 4 of each of the groups is even.

2. The quantum-key distribution method of claim 1, wherein the representing of the number of the users comprises acquiring the key by sequentially conducting a bit operation on the qubit measurement results of each of the users of the group.

3. The quantum-key distribution method of claim 2, wherein the representing of the number of the users comprises transmitting the bit operation result on the measurement results from a predetermined user elected a collector among the users of the group sequentially to each of the users, wherein the collector receiving a final bit operation result acquires the group key.

4. The quantum-key distribution method of claim 1, further comprising determining whether an error occurs as a result of making public the key acquired by each of the groups with respect to a predetermined test bit string.

5. A quantum-key distribution method using a center one-to-one connected to groups consisting of at least one user, comprising:

preparing a predetermined number of entangled states consisting of one more qubit than the number of the users in the center, and generating quantum states corresponding to each of the users consisting of the qubits belonging to each of the entangled states in the center;

keeping a single qubit included in each of the entangled states, and transmitting each of the quantum states from the center to each of the users after an authentication procedure;

making public an axis used to measure each of the qubits constituting the quantum states;

representing as modulo 4 the number of the users of each of the groups measuring the qubits with a predetermined axis on the basis of information on the axis made public;

selecting in the center a measurement axis of a qubit kept by the center so that the sum of modulo 4 of each of the groups is even, and transmitting a result measured with the selected axis from the center to each of the groups; and acquiring keys of each of the groups from the measurement results of the users of each of the groups.

* * * * *